Dec. 8, 1964 D. J. GESTLER 3,160,008
FLOW RESPONSIVE SIGNAL GENERATOR
Filed March 7, 1961 5 Sheets-Sheet 1

Fig.1

INVENTOR
David J. Gestler

BY *Strauch, Nolan & Neale*

ATTORNEYS

Dec. 8, 1964  D. J. GESTLER  3,160,008
FLOW RESPONSIVE SIGNAL GENERATOR
Filed March 7, 1961  5 Sheets-Sheet 2

INVENTOR
David J. Gestler

BY *Strauch, Nolan & Neale*
ATTORNEYS

Dec. 8, 1964   D. J. GESTLER   3,160,008
FLOW RESPONSIVE SIGNAL GENERATOR
Filed March 7, 1961   5 Sheets-Sheet 3

INVENTOR
David J. Gestler
BY *Strauch, Nolan & Neale*
ATTORNEYS

Dec. 8, 1964     D. J. GESTLER     3,160,008
FLOW RESPONSIVE SIGNAL GENERATOR
Filed March 7, 1961     5 Sheets-Sheet 4

INVENTOR
David J. Gestler

BY
ATTORNEYS

Dec. 8, 1964  D. J. GESTLER  3,160,008
FLOW RESPONSIVE SIGNAL GENERATOR
Filed March 7, 1961  5 Sheets-Sheet 5

INVENTOR
David J. Gestler
BY
*Strauch, Nolan + Neale*
ATTORNEYS

United States Patent Office 3,160,008
Patented Dec. 8, 1964

3,160,008
FLOW RESPONSIVE SIGNAL GENERATOR
David J. Gestler, Pittsburgh, Pa., assignor to Rockwell Manufacturing Company, Pittsburgh, Pa., a corporation of Pennsylvania
Filed Mar. 7, 1961, Ser. No. 93,971
16 Claims. (Cl. 73—232)

The present invention relates to fluid flow responsive signal generators and more particularly to signal generators for producing electrical output signals bearing a predetermined quantitative relationship to the fluid flow therethrough.

In certain fluid systems, of which water softener systems are typical, it is necessary for the successful operation of the system to modify the system operation from time to time for various purposes. In water softening systems, the purpose is regeneration of the water softening material. The duration of the interval between the times when it is actually necessary to regenerate water softening material in such a system is dependent upon the rate which the water supplied through the softening system is consumed. If little water is being used, this interval will be quite long. If water is being used at the maximum rate, the period will be quite short.

In the past it has been customary in automatic regeneration systems to regenerate the softening mineral periodically after the elapse of a predetermined time without regard to the quantity of water softened and used between regeneration cycles. If the time between regeneration cycles is set to accommodate water used at the maximum rate to prevent unnecessary large amounts of hard water being consumed, when little or no water is being used, waste of the regenerating material results.

It is the primary object of the present invention to eliminate these difficulties in water softening and like fluid systems by providing a fluid flow responsive signal generator which can be interposed in the fluid system to accurately measure the quantity of fluid flow and which is operative to produce an aperiodic succession of control signals each indicative of flow through the generator of a predetermined quantity of fluid during the interval subsequent to the immediately preceding signal.

More specifically it is an object of this invention to provide a fluid flow responsive signal generator embodying a positive displacement fluid flow measuring device, an automatically resettable predetermining register driven thereby, and a signal producing switching device actuated by said register at a predetermined point in its cycle to produce an output signal.

These and other objects of the present invention will become more fully apparent by reference to the appended claims and as the following detailed description proceeds in reference to the accompanying drawings wherein:

SYSTEM GENERAL DESCRIPTION

Figure 1:
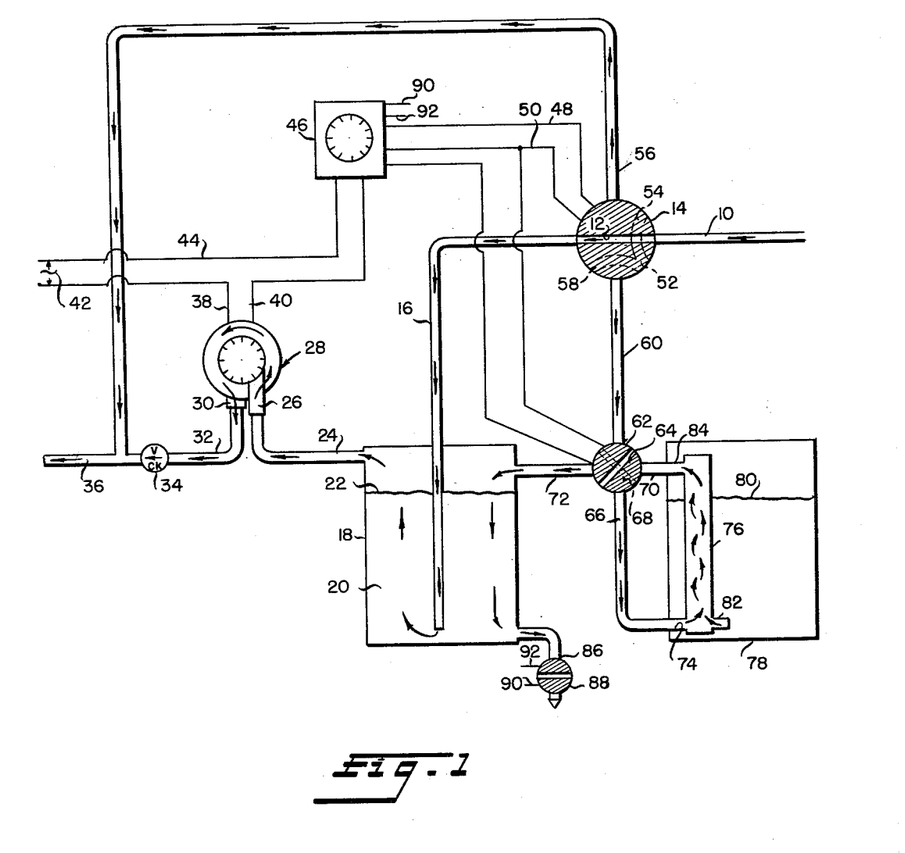
FIGURE 1 is a schematic illustration of a water softening system embodying a fluid flow responsive signal generator constructed in accord with the principles of the present invention.

Referring first to FIGURE 1, the water softener system therein shown illustrates a typical application of the fluid flow responsive signal generator of the present invention. During normal water softening operation, hard water from a suitable water supply main enters the system through an inlet conduit 10, passes through the passage 12 of a valve 14 and a conduit 16 for discharge into the bottom of a tank 18 filled with a suitable water softening mineral 20 to the level indicated at 22. The hard water flows upwardly in tank 18 through the softening mineral material 20 and passes out of the tank 18 as soft water through a conduit 24 into the inlet 26 of a flow responsive signal generator 28 constructed in accord with the present invention as will be described presently. Soft water is discharged from the signal generator 28 through its outlet 30, a conduit 32, and a check valve 34 into the water distribution line 36 for distribution to the various points of use.

As will become apparent presently, the flow responsive signal generator 28 is a positive displacement type fluid meter equipped with a selectively adjustable automatically resettable register. With the system in operation as described so far, the water passing through the generator 28 will gradually increase the registration on the register of the generator 28 until a selected pre-set maximum registration is reached. The selection of the pre-set maximum is determined by the hardness of the water and the quantity of softening mineral 20 in the tank 18. For very hard water or when the capacity of tank 18 softening mineral 20 is relatively small, the pre-set maximum must be less than for comparable conditions but with less hard water or a larger volume of water softening mineral. The pre-set maximum is set when the system is installed and normally requires no further adjustments. When that registration is reached, the signal generator 28 will close a switch therein to complete an electrical connection between the input electrical lead 38 and output lead 40 thereof. Electrical interconnection of the leads 38 and 40 completes a circuit from a suitable source of electrical power indicated at 42 through the leads 38 and 40 and 44 to an electric timing mechanism 46. Due to the internal circuitry of timing mechanism 46, closure of the switch in the generator 28 will initiate one cycle of operation of timing mechanism 46 but timing mechanism 46 will not re-cycle until after the switch in generator 28 has been opened and re-closed. That is, a single closure of the switch of generator 28 will produce only a single cycle of timing mechanism 46 no matter how long the switch remains closed. Energization of the timing mechanism 46 is effective through leads 48 and 50 to actuate the electrically actuated valve 14 to rotate the passage 12 out of alignment with the conduits 10 and 16 to terminate the flow therebetween and to position the inlet passage 52 of valve 14 in fluid communication with conduit 10, the outlet passage 54 of valve 14 in fluid communication with conduit 56 and the outlet passage 58 of valve 14 in fluid communication with conduit 60. When valve 14 is so positioned, hard water will flow from the inlet conduit 10 through inlet 52 and outlet 54 into the conduit 56 which is a by-pass conduit connected as shown to the distribution line 36 downstream of the check valve 34. Check valve 34 prevents reverse flow of hard water through generator 28.

In this position of valve 14, inlet conduit 10 will also be connected through inlet 52 and outlet 58 of valve 14 to the conduit 60.

At the same time that valve 14 is actuated by electric timer 46, a further electrically actuated valve 62 is actuated to align its passage 64 with conduit 60 and a conduit 66 to permit fluid flow from conduit 60 to conduit 66 and to position its passage 68 in alignment with conduits 70 and 72 to permit fluid flow from conduit 70 to conduit 72. The hard water passing through conduit 60, valve passage 64 and conduit 66 flows into the bottom inlet 74 of a brine mixing tank 76 disposed in a dry salt storage tank 78 normally filled with dry salt to the level indicated at 80. Salt enters the mixing tank 76 through the inlet 82 from the tank 78. The brine is discharged from the brine mixing tank 76 through the outlet 84 at the top thereof into the conduit 70, through the valve passage 68 and the conduit 72 into the softening mineral tank 18 for downward filtering flow through the softening mineral 20 to a brine solution drain 86.

Flow continues in this pattern for a predetermined time as determined by the electric timer 46 sufficient to regenerate the softening mineral 20. After the elapse of that predetermined time, the timer 46 restores the valves 14 and 62 to their original position to disconnect the softening mineral tank 18 from the brine mixing tank 78, to disconnect the brine mixing tank from the inlet conduit 10 and to connect the inlet conduit 10 through the valve passage 12 to the tank 18 of the softening material. The bypass passage 56 is closed by the valve 14 at this same time.

An electrically operated drain valve 88, which is connected by leads 90 and 92 to the electric timer 46, opened when valves 14 and 62 are first shifted at the beginning of the regeneration cycle and is maintained open for a predetermined time after restoration of the valves 14 and 62 to their normal position to provide a fresh water rinse of the softening mineral 20 after the brine solution back-wash is completed. Upon completion of the rinse as determined by the electric timer 46, drain valve 88 is again closed, the regeneration cycle completed and the system restored to its normal water softening operating condition as originally described.

SIGNAL GENERATOR (FIRST EMBODIMENT)

Figure 3:
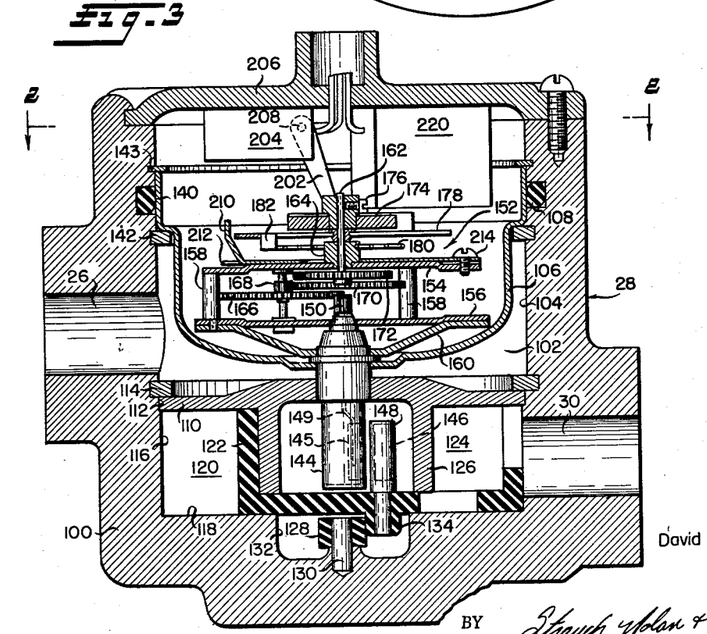
FIGURE 3 is a vertical longitudinal sectional view of the signal generator of FIGURE 2 taken substantially along the line 3—3 of FIGURE 2.

Referring to FIGURE 3, the signal generator 28 comprises a casing 100 in which the inlet passage 26 and the outlet passage 30 are formed. In its passage between inlet 26 and outlet 30, water flows into an annular chamber 102 defined by the internal cylindrical wall 104 of the casing 100, the external surface of a register casing 106 which is maintained in fluid tight relation with the wall 104 by a radially compressed annular O-ring 108, and the top wall surface of a transverse partition 110 peripherally received within an annular groove 112 and retained therein by a spring washer 114. The partition 110 cooperates with a cylindrical wall 116 and a bottom wall 118 of the casing 100 to define an oscillating piston measuring chamber 120 in which a bottom web type oscillating piston 122 is mounted for oscillatory movement relative to a flow division plate 124 extending radially of the chamber 120 between an inner annular guide ring 126 integral with and depending from the partition 110 concentrically with the chamber wall 116. The piston 122 is guided for oscillatory movement about the axis of the chamber 120 by a guide roller 128 journalled upon a stud 130 within the bottom recess 132 in the wall 118. A depending integral lug 134 on the bottom of the piston 122 is in rolling engagement with the roller 128 to guide the movement of the piston 122 about the axis of the chamber 120. Piston 122 and guide roller 128 are concentrically formed of hard rubber and casing 100 and partition 110 of suitable rigid non-corrosive material such as bronze. Water enters the chamber 120 through an opening in the partition 110 at one side of the flow division member 124 and discharges from chamber 120 into the outlet passage 30 the inlet end of which is located on the opposite side of the flow division member 124 from the opening through partition 110. The motion of the piston 122 within the chamber 120 is the conventional oscillating motion of an oscillating piston within its chamber.

The register casing 106 is of generally cup-shape configuration and is axially confined within the casing 100 by the co-action of the annular portion 140 thereof with snap rings 142 and 143 engaged with radial recesses in the cylindrical wall 104 as shown. The register casing 106 has a closed bottom depending hollow tubular well 144 of non-magnetic material within the interior of which is disposed a driven roller magnet 145 drive coupled through the non-magnetic wall of well 144 to a driving magnet 146 disposed within tubular driving magnet housing 148 of non-magnetic material fixed concentrically to the piston 122. This magnetic drive coupling is for illustrative purposes identical with that disclosed in United States Patent No. 2,858,461 issued October 28, 1958 to R. Z. Hague et al. for Meter Registers and Drive Mechanisms Therefor. Each cycle of oscillation of the piston 122, through the intermediary of magnets 145 and 146 and crank spindle 149, produces one rotation of the input pinion 150 of the register reduction drive gearing 152 as is fully described in said Hague et al. patent to which reference is made in the event a further explanation is found to be necessary to the understanding of the present invention.

The register drive gearing 152 is mounted between spaced parallel plates 154 and 156 held in spaced relation by spacers 158 and supported upon the upward extension of the tubular well 144 by a yoke 160. Pinion 150 drives the output shaft 162, which is journalled within a hub 164 fixed to the plate 154, by a gear train comprising a gear 166 meshing with pinion 150, a pinion 168 fixed concentrically to gear 166 and meshing with a gear 170, a pinion (not shown) fixed concentrically to gear 170 and meshing with the gear 172 fixed to the shaft 162 beneath plate 154.

A knurled drive wheel 174 is fixed to the upper end of shaft 162 by a set screw 176. Knurled drive wheel 174 constitutes the input element of a one way clutch mechanism about to be described.

Figure 2:
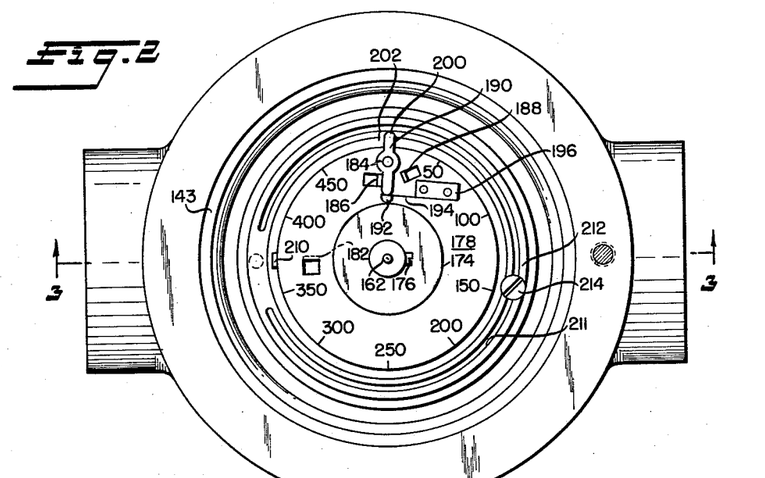
FIGURE 2 is a top plan view of a first illustrative embodiment of the fluid flow responsive signal generator in accord with the principles of the present invention with top cover and the parts supported thereby removed thereby constituting in effect a section taken substantially along the line 2—2 of FIGURE 3.

The driven element of this clutch mechanism is a disc 178 journalled for rotation about the shaft 162 and resiliently biased in a counterclockwise direction about the axis of shaft 162 as viewed in FIGURE 2 by a spiral spring 180 (FIGURE 3) fixed at its outer end to a depending tab 182 on disc 178 and at its inner end to the fixed hub 164.

Fixed to the disc 178 for pivotal movement about a stub shaft 184 (FIGURE 2) between limit tabs 186 and 188 is a disc actuating lever 190. When lever 190 is in its clockwise limit position about the shaft 184 as shown in FIGURE 2, it forces a contact arm 192 into frictional driving engagement with the periphery of the knurled drive wheel 174 as shown. The contact arm 192 is mounted on the end of a spring 194 fixed at its opposite end to the plate 178 by bracket 196. Leaf spring 194 normally biases contact arm 192 away from contact with the periphery of the knurled drive wheel 174 so that, when lever 190 is pivoted in a counterclockwise direction from the position shown into engagement with stop 188, contact arm 192 is biased from engagement with the periphery of the knurled wheel 174. By this construction, when the lever 190 is in the position shown, clockwise rotation of the shaft 162 and the knurled drive wheel 174 fixed thereto will, through the contact arm 192, the leaf spring 194 and the bracket 196, impart concomitant clockwise rotation to the disc 178. When the disc actuating lever 190 is pivoted against stop 188, there is no driving connection between the knurled drive wheel 174 and the disc 178 and the position of the disc 178 is determined by the counterclockwise resilient biasing force exerted thereon by the spiral spring 180 and the various stops therefor to be described presently.

The pivotal motion of the disc actuating lever 190 is effected in a clockwise direction about the stub shaft 184 by the engagement of the rearwardly extending portion 200 thereof with a depending arm 202 (best shown in FIGURE 3) of a single pole single throw switch 204 fixed to the top cover 206 of the casing 100. The arm 202 has a limited pivotal movement about a shaft 208 internally of the switch 204. When pivoted to its clockwise limit, the contacts of the switch 204 are closed.

Switch 204 is of the over dead center snap acting type and arranged to allow a predetermined counterclockwise movement of arm 202 from its extreme clockwise limit before the contacts open. In the specific illustrated embodiment, with maximum flow through the meter, it takes approximately two minutes for disc 178 to move sufficiently to open the contacts of switch 204 from the time disc 178 is first restored. The time will of course be proportionately longer for flow rates less than maximum. This minimum interval of closure of switch 204 is determined by the characteristic of the timer 46 (FIGURE 1).

Arm 202 is normally biased in a counterclockwise direction about the shaft 208 by the contact spring force of the normally open contacts of the switch 204. The force of the spiral spring 180 exerted through the disc 178, the shaft 184, the lever 190 is sufficient to overcome the counterclockwise bias upon the arm 202 by the spring contacts of the switch 204 to shift arm 202 to its clockwise limit position when disc 178 is released from its drive connection to wheel 174 through arm 190. When the arm 202 reaches its clockwise limit position, it will prevent further movement of the end 200 of the lever 190 and cause the lever 190 to pivot about the shaft 184 into engagement with the stop 186 and thus arrest further counterclockwise rotation of the disc 178. When the lever 190 is in this position in engagement with stop 186, the contact arm 192 is forced into driving engagement with the periphery of the knurled drive wheel 174.

It will be recalled from reference to FIGURE 1, that when the contacts of switch 204 are closed a circuit connection is established between leads 38 and 40 to actuate the electric timer 46 which will terminate flow through the fluid flow responsive signal generator 28 until completion of the regeneration cycle. The contacts of switch 204 will thus remain closed so long as no fluid is passing between the inlet port 26 and the outlet port 30 of the generator 28. After the regeneration cycle is completed, fluid flow through the generator 28 will be re-established. As the water is consumed, the oscillating piston 122 will oscillate within the chamber 120 to measure the volume of water being consumed. As the piston 122 oscillates, it will drive the input pinion 150 of the gear train 152 and thereby drive the output shaft 162 and the knurled drive wheel 174. Rotation of the drive wheel 174 will, through its frictional engagement with the contact arm 192, the leaf spring 194, the bracket 196 fixed to the disc 178, impart clockwise rotation to the disc 178. It will be noted that in this drive, rotation of the drive wheel 174 does not impart any rotation producing torque to the lever 190 so that lever 190 will remain in engagement with stop 186 as the disc 178 moves in a clockwise direction to disengage the arm 200 of lever 190 from the switch actuating arm 202. Disc 178 will continue to rotate in a clockwise direction until the arm 200 of the lever 190 engages a stop 210 disposed in its path and fixed to a disc 212. Disc 212 is pivotally mounted about the hub 164 relative to the plate 154 and is selectively fixed to plate 154 by a lock screw 214 the shank of which passes through an elongated arcuate slot in disc 212 concentric with the shaft 162 and threadedly engaged with the plate 154. By this construction the disc 212 can be rotated about the hub 164 to position the stop 210 at any desired position and thereafter clamped to the plate 154 by screw 214 to fix its position and thus pre-set the maximum registration of this predetermining register.

When the lever 190 reaches the position in which its arm 200 engages the stop 210, the lever 190 will be pivoted in a counterclockwise direction about the stub shaft 184 into engagement with its stop 188. This motion of lever 190 releases the force urging the contact arm 192 into engagement with the periphery of the knurled drive wheel 174 and releases disc 178 from its drive connection to the drive wheel 174. Upon release of disc 178 from its drive connection to the drive wheel 174, it will be pivoted in a counterclockwise direction about the axis of shaft 162 under the biasing force of the spiral spring 180.

In installations where, as in FIGURE 1, the fluid being consumed during the regeneration cycle is bypassed around the generator 28, it suffices to permit the disc 178 to immediately rotate in a counterclockwise direction under the biasing force of spring 180 to the position shown in FIGURE 2 in which its arm 200 engages the switch actuating arm 202 of the switch 204 to actuate the timer.

In systems (not shown) such as where two alternatively operative tanks 18 are provided where fluid flow through the generator 28 takes place while the regeneration cycle or other cycle initiated by the closure of the switch 204 is in progress, it is possible that the disc 178 will again reach its limit position before completion of the process initiated by the closure of switch 204. In systems such as this, it is necessary to prevent re-closure of the switch 204 before the original process is completed. For this purpose a lockout solenoid 220 is fixed within the cover 206.

Solenoid 220 is energized upon initiation of operation of the timer 46 and is maintained energized until the cycle controlled by timer 46 is completed. Energization of the solenoid 220 is operative to place a one-way acting stop pawl in the return path of the lever 190 between the switch arm 202 and the lever 190 to prevent re-engagement of the lever 190 with the switch arm 202 so long as the solenoid 220 remains energized. This one-way acting stop positioned by the solenoid 220 is located radially of the disc 178 to engage the central hub of the lever 190 so that it can arrest return motion of the disc 178 without pivoting the lever 190 into engagement with stop 186 to re-establish the drive between the knurled drive wheel 174 and the disc 178 but will not interfere with the normal forward motion of lever 190 in response to fluid flow.

In the particular illustrated embodiment, the shaft 162 makes one revolution for each five hundred gallons of water passing through the measuring chamber 120. As is apparent from FIGURE 2, the disc 178 has been calibrated to equal increments from zero to 500. This scale on the top of disc 178, when disc 178 is in its zero position as shown in FIGURE 2, is utilized in connection with the stop arm 210 to select the maximum volume to be registered by the meter between actuations of the switch 204. With the arm 210 set as shown in FIGURE 2, midway between the indications 350 and 400, the signal generator 28 will meter 375 gallons of water between its actuations of the switch 204. The arcuate slot 211 in the disc 212 through which the shank of the screw 214 passes is of such an extent that the volume can be selected to any value between 50 and 500 gallons.

SIGNAL GENERATOR (SECOND EMBODIMENT)

Figures 4, 5:
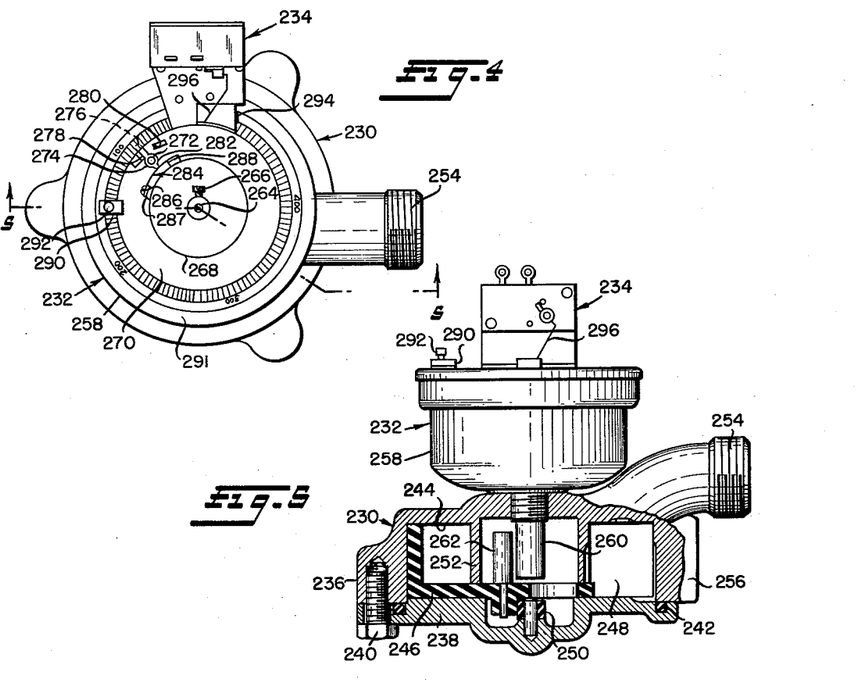
FIGURE 4 is a top plan view of a fluid flow responsive signal generator constituting a second embodiment of the present invention.
FIGURE 5 is a front elevational view, partially in section, taken substantially along the line 5—5 of FIGURE 4.
Figure 6:
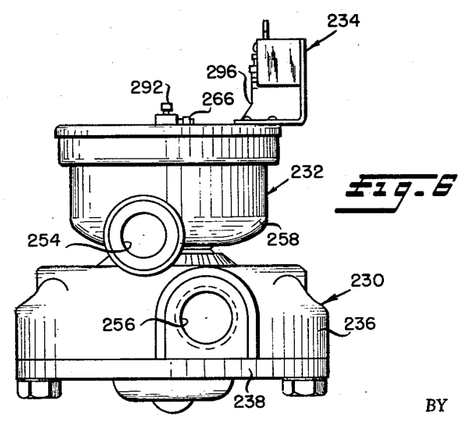
FIGURE 6 is a right side elevational view of the signal generator illustrated in FIGURE 4.

FIGURES 4, 5 and 6 illustrate a second embodiment of the present invention embodying a positive displacement type fluid meter 230, a selectively settable predetermining register 232 and a signal generating switch device 234.

The fluid meter 230 comprises a casing 236 (FIGURE 5) having a bottom wall 238 fixed thereto by bolts 240 and maintained in fluid tight relation therewith by an axially compressed annular O-ring 242 to define a measuring chamber 244. An oscillating piston 246 is mounted within chamber 244 for oscillatory movement in the conventional manner with respect to a radially extending division plate 248, a central rotatable guide roller 250 and a central fixed annular guide ring 252 in response to flow of fluid through chamber 244 between inlet 254 and outlet 256 which communicate with chamber 244 on opposite sides of the division plate 248.

The register mechanism 232 has an external casing 258 provided with a depending well 260 of non-magnetic material extending in fluid tight relation through the top wall of the casing 236 and projecting coaxially into the measuring chamber 244 internally of the guide ring 252. As in the previous embodiment, a driven magnet (not shown) is disposed within well 260 for free rolling movement in driving engagement with a crank disposed within its path of rolling movement. The driven magnet within well 260 is drive coupled to a driving magnet (not shown) disposed internally of the hollow pin 262 fixed coaxially to the center of the oscillating piston 246. Thus, each oscillation of the oscillating piston 246 causes a magnet within the well 260 to roll completely about the interior wall of the well 260 and impart one rotation to the crank which is the input element to the register 232. The register 232 has an output shaft 264 (FIGURE 4) to which is fixed by a set screw 266 a peripherally knurled drive wheel 268 the peripheral knurled portion of which forms one element of a one way clutch. The drive connection between the magnet within well 260 (FIGURE 5) and the output shaft 264 (FIGURE 4) is preferably identical with the drive train illustrated in FIGURE 3 for the second embodiment of this invention, with the exception that the direction of rotation of the gears and shafts are reversed.

A follower disc member 270 is journalled for pivotal movement about the axis of shaft 264 and pivotally supports upon a stub shaft 272 an actuator member 274. Actuator member 274 has a first portion 276 extending between a pair of stops 278 and 280 fixed to the disc 270 and a second and oppositely projecting portion 282 which coacts with a driving clutch member 284 in the form of a leaf spring fixed by a screw 286 to an upturned tab 287 on the disc 270 and having a lug 288 engageable with the knurled periphery of the wheel 268. When the actuator 274 is in the position illustrated in engagement with the stop 278, its portion 282 forces the driven clutch element 284 into frictional driving engagement with the knured periphery of the wheel 268 so that, as the shaft 264 rotates in a counterclockwise direction in response to fluid flow through the measuring chamber 244 (FIGURE 5), it will impart counterclockwise rotation to the disc wheel 270. A first limit stop 290 is fixed to a detachable calibrated rim 291 of the casing 258 of the register 232 by a screw 292 and a second limit stop 294 is fixed to the casing 258 adjacent the signal generating switch 234. The rim 291 is substantially identical in construction and interfits with the casing 258 in substantially the same manner as the casing rim of the embodiment of FIGURES 10 and 11 described in detail presently.

As the disc 270 continues to rotate in a counterclockwise direction from the intermediate position illustrated in FIGURE 4 it will bring the portion 276 of the actuator 274 into engagement with a stop 290 so that continued counterclockwise rotation of the disc 270 will produce clockwise rotation of the actuator 274 about its pivot stud 272 to thereby release the driven clutch element 284 from engagement with the knurled periphery of the wheel 268 to permit the disc 270 to move in a clockwise direction independently of the knurled wheel 268 under the clockwise biasing force exerted upon it by a spiral spring (not shown) which may be identical in form to the spring 180 of the embodiment shown in FIGURE 3.

As the disc 270 moves in a clockwise direction under the influence of the spiral spring, the portion 276 of the actuator 274 which is now in engagement with stop 280 will engage a depending wire actuator arm 296 of the generator switch 234 to actuate that switch and close the contacts thereof to thereby produce an output signal. Continued rotation of the disc 270 in a clockwise direction will bring the portion 276 of the actuator 274 into engagement with the stop 294, the zero limit stop, to thereby shift the portion 276 of actuator 274 from engagement with its stop 280 into engagement with its stop 278 and thereby re-engage a driven clutch element 284 with the knurled periphery of the drive wheel 268.

With the foregoing brief description, it is apparent that the operation of this embodiment of the invention is substantially the same as that of the embodiment of FIGURES 2 and 3. A further detailed description thereof is therefore believed to be unnecessary.

SIGNAL GENERATOR (THIRD EMBODIMENT)

Figures 7, 8, 9:
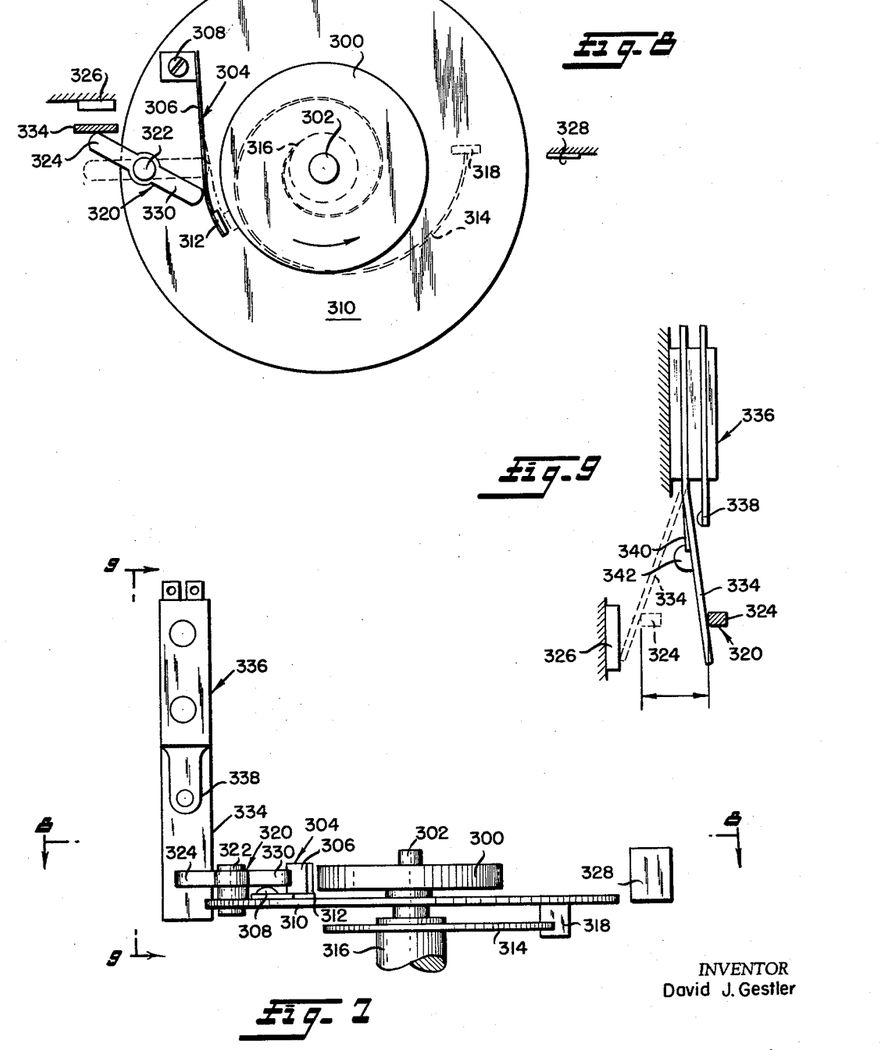
FIGURE 7 is an elevational view of an alternative form of signal generating predetermining register mechanism constituting a third embodiment of this invention.
FIGURE 8 is a sectional view substantially along the line 8—8 of FIGURE 7.
FIGURE 9 is a sectional view substantially along the line 9—9 of FIGURE 7.

The embodiment diagrammatically illustrated in FIGURES 7, 8 and 9 is a simplified arrangement which is preferred when open contact switches are acceptable in a particular installation.

As in the previous embodiment, a peripherally knurled drive wheel 300 is fixed to the output shaft 302 of the register drive to form one element of a clutch and a driven clutch element 304 in the form of a leaf spring 306 fixed at 308 to a disc 310 which is journalled for pivotal movement about the axis of the shaft 302. A friction element 312 is fixed to the free end of the leaf spring 306 for frictional engagement with the knurled periphery of the drive wheel 300. Disc 310 is biased in a clockwise direction by a spiral spring 314 which is fixed at its center to the fixed support post 316 on which the disc 310 and the shaft 302 are journalled and which is fixed at its outer end to a depending tab 318 fixed to the underside of the disc 310. The driven clutch element 304 is controlled by an actuator 320 pivoted upon a stud 322 fixed to the disc 310 and has a first portion 324 projecting beyond the periphery of disc 310 for coaction with fixed stops 326 and 328 and an inwardly projecting portion 330 coacting with the leaf spring 306 of the clutch element 304. When the actuator 320 is in the pivoted position shown in full lines in FIGURE 8, the clutch element 304 is dis-engaged from the drive wheel 300 due to the resilience of the leaf spring 306. When the actuator 320 is pivoted in a counterclockwise direction about the pivot stud 322 from its full line position to its dotted line position as shown in FIGURE 8, it shifts the driven clutch element 304 to the dotted line position of the element 304 illustrated in FIGURE 8 in which its friction element 312 is in driving engagement with the knurled periphery of the drive wheel 300. When in this position, the counterclockwise rotation of the knurled wheel 300 produces concomitant counterclockwise rotation of the disc 310. Continued counterclockwise rotation of the disc 310 will bring the portion 324 of the actuator 320 into engagement with the stop 328 to shift it to its clutch disengagement position illustrated in full lines in FIGURE 3 and will permit restoration of the disc 310 in a clockwise direction under the influence of spring 314. As the disc 310 is restored in a clockwise direction and approaches the fixed stop 326, the portion 324 of the actuator 320 will reach the position illustrated in FIGURE 8 in which it engages the movable arm 334 of a snap actuated switch assembly 336, the details of which are best illustrated in FIGURE 9. The switch 336 comprises a fixed contact 338, a movable spring leaf contact 340 and the actuating arm 334, which is resiliently biased to its full line position in which switch assembly 336 is open circuited. Actuating arm 334 and spring leaf contact 340 are interconnected by a U-shaped spring 342 in the conventional manner for snap acting switches so that as the actuating arm 334 moves in a clockwise direction as viewed in FIGURE 9 to a position in which the spring 342 passes its dead center position, the spring leaf contact 340 will snap into engagement with the fixed contacts 338 and remain in contact with said fixed contacts 338 throughout the remainder of the path of motion of the actuator 334 until it reaches the fixed stop 326 as illustrated by the dotted line position for actuator arm 334 and clutch actuator 324 in FIGURE 9. When spring actuator 334 reaches this position, further clockwise motion of the portion 324 of actuator 320 with the disc 310 is precluded and the clutch actuator 320 thereby caused to pivot in a counterclockwise direction about its pivot stud 322 to re-engage the driven clutch element 304 with the knurled periphery of the wheel 300.

SIGNAL GENERATOR (FOURTH EMBODIMENT)

Figure 10:
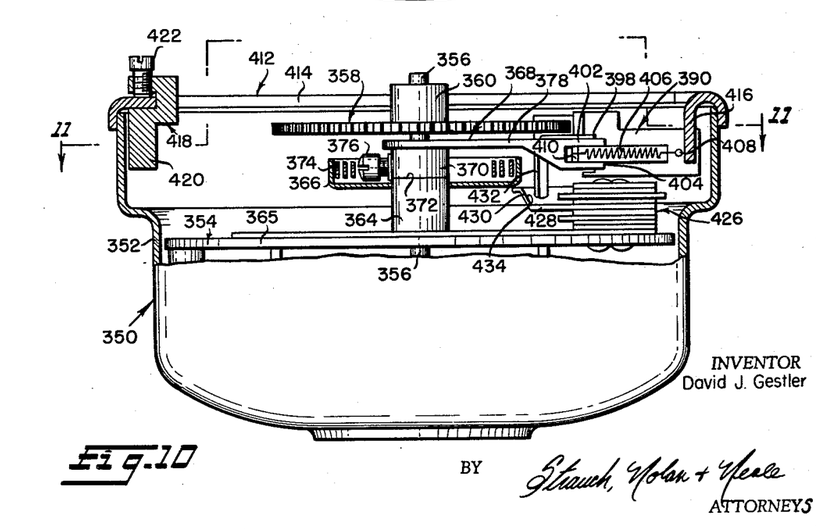
FIGURE 10 is a side elevational view, partially in section of a further alternative form of signal generating predetermining register mechanism constituting a fourth embodiment of this invention.
Figure 11:
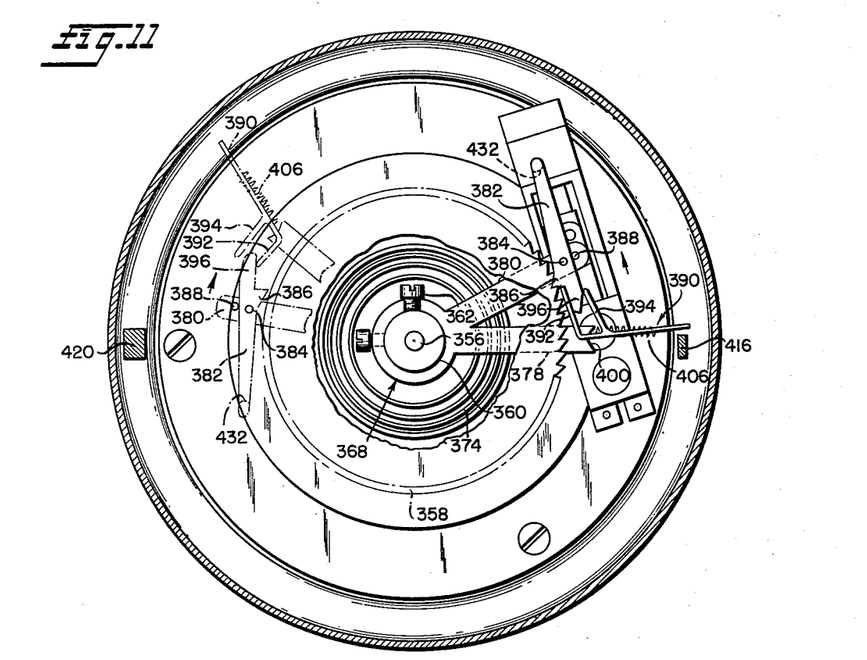
FIGURE 11 is a sectional view taken substantially along the line 11—11 of FIGURE 10.

FIGURES 10 and 11 illustrate a modified form of predetermining register which may be utilized with the positive displacement meters of either the first or second embodiments.

In the embodiments of FIGURES 10 and 11, the register mechanism 350 has a generally hollow cup-shaped casing 352 within the bottom of which is mounted a speed reducing gear train (not shown) which may be identical to and driven in the same manner as those of the previous embodiments and which is supported upon a support frame 354. Attached to the upper end of the output shaft 356 for this gear train is a ratchet wheel 358. Ratchet wheel 358 has a central hub 360 fixed to the upper end of shaft 356 by a set screw 362 (FIGURE 11).

The drive spindle or output shaft 356 is journalled within a bushing 364 (FIGURE 10) fixed to the top plate 365 of the gear train support frame 354. A spring retaining cup 366 is suitably fixed to the top of the bushing 364 as by brazing. A follower member 368, having a central hub 370, is mounted for pivotal movement about the spindle 356, is axially supported within the spring cup 366 by a bearing washer 372 and is interconnected to the cup 366 by a spiral spring 374 fixed at its inner end to hub 370 by a set screw 376 and fixed at its outer end to the interior peripheral wall of cup 366 by suitable means (not shown). As is apparent from FIGURE 11, spring 374 is effective to bias the member 368 in a clockwise direction about the drive spindle 356.

Member 368, as is best shown in FIGURE 11, has a pair of angularly spaced radially extending arms 378 and 380. A drive pawl 382 is pivotally mounted upon arm 380 adjacent its outer end by a pivot stud 384 for movement between an engaged position in which its tooth 386 is in driving engagement between an adjacent pair of the peripheral teeth of the ratchet wheel 358 as shown in the full lines to the right in FIGURE 11 and a disengaged position, as shown to the left in phantom lines in FIGURE 11, in which its tooth 386 is disengaged from the peripheral teeth of the ratchet wheel 356. In this position, pawl 382 is in engagement with a stop pin 388 on the outer end of arm 380.

The pivoted position of drive pawl 382 is controlled by an actuator arm 390 having a pair of arms 392 and 394 which embrace the extension 396 of the pawl 382. As is best shown by comparison of FIGURES 10 and 11, the actuator 390 has a knife edge 398 by which it is pivoted in aligned V notches 400 in vertically spaced arm extensions 402 and 404 of the arm 378. The actuator 390 is retained in pivoted engagement with the arm 378 by a tension spring 406 connected to actuator 390 at 408 and to arm 378 at 410 on opposite sides of the pivot edge 398. Actuator 390 and spring 406 thus provide a snap acting over dead center pivotal movement of the actuator 390 with respect to the arm 378 of the member 368.

Mounted upon the top of the casing 352 is a rim member 412 having a radially inwardly extending flange 414 about the major portion of its circumference and a downwardly extending tab 416. The downwardly extending tab 416 defines the zero limit stop of the register mechanism. A circumferentially movable stop member 418 having a depending portion 420 disposed within the path of movement of the actuator 390 is selectively fixed to the radial flange 414 of the rim 412 by a set screw 422 at any desired position in circumferentially spaced relation to the fixed stop 416 to define the pre-set maximum registration of the predetermining register.

By the construction described thus far it is apparent that, with the pawl 382 engaged with the ratchet wheel 358 as shown in full lines in FIGURE 11, the follower member 368 will move in a counterclockwise direction with the ratchet wheel 358 in opposition to the biasing force of spring 374 until the actuator 390 is engaged with stop 420 and is shifted by the continued movement of the follow member 368 in a clockwise direction with respect to follower member 368 past its dead center position. When actuator 390 is so pivoted, it will snap pawl 382 to its released position (shown in phantom lines) to permit follower member 368 to restore in a clockwise direction under the biasing force of spring 374 toward its zero limit position. When the follower member 368 closely approaches its zero limit position, actuator 390 will engage the zero limit stop 416. Continued clockwise movement of the follower member 368 will shift actuator 390 in a counterclockwise direction with respect to the follower member 368 past its dead center position to re-engage the pawl 382 with the ratchet wheel 358 to re-establish the drive connection between follower member 368 and ratchet wheel 358.

Referring to FIGURE 10, a normally open snap actuated switch assembly 426 similar to that illustrated in FIGURE 9 is mounted upon the frame structure 354 beneath the path of movement of the follower member 368 adjacent its zero limit position. The actuator arm 428 of switch assembly 426 extends generally parallel to the path of movement of the follower member 368 and has an upturned end portion 430 disposed in the path of movement of a downwardly extending portion 432 of the pawl 382 at its end most remote from the pivot 384. As it is apparent from FIGURE 11, when the follower member 368 is being driven in a counterclockwise direction and the pawl 382 is in engagement with the ratchet wheel 358, the downward extension 432 of the pawl 382 is in position to engage the upper extension 430 of the switch actuator arm 428 but when the pawl 382 is in its disengaged position as illustrated in phantom lines in FIGURE 11, its downward extension 432 moves in a path radially inwardly of the upward extension 430 of the switch actuating arm 428 and therefore does not engage the switch actuating arm 428 during return movement of the follower member 368. This construction is preferred over the previous embodiments because the power necessary to actuate the switch 426 is derived directly from the power on shaft 356 during the forward driving movement of the follower member 368 rather than from the power stored in the return spring as in the previous embodiments. This permits use of a weaker return spring 374 than in the previous embodiments thus imposing a lesser constant load on the magnetic drive to the register. The angle of inclination of the cam surface 434 of the upper extension 430 of the actuating arm 428 is such to provide a minimum peak load upon the shaft 356.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid flow responsive signal generator comprising: a fluid flow measuring device having an output element cyclically movable at a frequency substantially proportional to the rate of fluid flow therethrough, whereby a given number of cycles is indicative of the flow of a predetermined quantity of fluid through said measuring device; means automatically and periodically actuated solely by said measuring device after each uniformly numbered series of cycles for producing output signals, each indicative of the passage through said measuring device of a given quantity of fluid subsequent to the next preceding output signal; and predetermining register means operatively interposed between said measuring device and said output signal producing means for actuating the latter, said predetermining register means comprising rotatable means for actuating the signal producing means, clutch means for drive connecting said rotatable means to said output element, and means for disengaging said clutch means at the completion of each series of cycles, and said signal producing means comprises means for reengaging said clutch means to reestablish the drive connection between said rotatable means and said output element.

2. The combination defined in claim 1 wherein said signal producing means includes selectively adjustable means for varying the magnitude of said predetermined quantity.

3. The combination as defined in claim 1, together with means operable in response to and for the duration of an external control signal to delay the production of output signals by said signal producing means independently of the operation of said measuring device.

4. The combination defined in claim 1 wherein said fluid meter is a positive displacement meter.

5. The combination defined in claim 4 wherein said positive displacement meter comprises a measuring chamber having an inlet and an outlet and a fluid flow responsive member mounted for oscillatory movement therein in response to fluid flow through said measuring chamber between said inlet and said outlet, said fluid flow responsive member being drive coupled to said register.

6. The combination defined in claim 5 wherein said register and said measuring chamber are isolated by a static fluid tight seal having a non-magnetic portion, said fluid flow responsive member and said register being drive coupled through said seal non-magnetic portion by a magnetic coupling embodying a pair of members of magnetic material at least one of which is a permanent magnet, said members being disposed on opposite sides of said seal non-magnetic portion and magnetically coupled therethrough.

7. In combination with a positive displacement fluid meter having a rotatable output element rotated in response to fluid flow through said meter, predetermining register means including a member mounted for rotative movement by said output element at a rate proportional to the flow rate about the axis of said output element between first and second limit positions indicative, respectively, of the beginning of a flow registration cycle and of the passage of a predetermined quantity of fluid through the meter, means biasing said member toward said first limit position in the direction opposite to the direction of rotation of said output element, a clutch for drive connecting said member and said element whereby said element will drive said member about said axis as said element rotates in response to the flow of fluid through said meter, means at said second limit position for automatically disengaging said clutch to permit restoration of said member to said first limit position under the influence of said biasing means, and means activated by movement of said member substantially at said first limit position for generating a signal indicative of the flow of said predetermined quantity of fluid through said meter including means for automatically reengaging said clutch to thereby reestablish the drive connection between said output element and the rotatively mounted member.

8. In combination with a positive displacement fluid meter having a rotatable output element rotated in response to fluid flow through said meter, predetermining register means including a member mounted for pivotal movement by said output element at a rate proportional to the flow rate about the axis of said output element between first and second limit positions indicative, respectively, of the beginning of a flow registration cycle and of the passage of a predetermined quantity of fluid through the meter; means biasing said member toward said first limit position in the direction opposite to the direction of rotation of said output element, a clutch for drive connecting said member and said element and comprising a driving clutch element fixed to said output element, a driven clutch element pivoted on said member for engaging and disengaging movements relative to said driving clutch element, and an actuator pivoted on said member, said actuator having a first portion cooperating with said driven clutch element to control the position thereof and a second portion, means at said first limit position for automatically engaging said clutch to drive connect said element and said member whereby said element will drive said member about said axis as said element rotates in response to the flow of fluid through said meter, means at said second limit position for automatically disengaging said clutch to permit restoration of said member to said first limit position under the influence of said biasing means, means activated by movement of said member substantially at said first limit position for generating a signal indicative of the flow of said predetermined quantity of fluid through said meter, and a pair of stops disposed at circumferentially spaced positions about the path of movement of said actuator with said member, one of said stops being effective when engaged by said actuator to move said actuator relative to said member to engage said driven clutch element with said driving clutch element, the other of said stops being effective when engaged by said actuator to move said actuator relative to said member to disengage said driven clutch element from said driving clutch element.

9. The combination defined in claim 8 wherein said driving clutch element is a knurled peripheral portion of said output element, and wherein said driven clutch element comprises a leaf spring fixed at one end to said member and having a freely pivoted portion extending adjacent and frictionally engageable with said output element knurled peripheral portion.

10. The combination defined in claim 8 wherein said signal generating means further comprises a switch mounted adjacent said one of said stops, said switch having an actuating arm disposed for actuation of said switch while said member is adjacent its said first limit position.

11. The combination defined in claim 10 wherein said switch is a snap acting switch.

12. The combination defined in claim 8, wherein said driving clutch element is a peripheral portion of said output element provided with a circumferential row of ratchet teeth, wherein said driven clutch element comprises a pawl pivotally mounted on said member for movement between engaged and disengaged positions relative to said ratchet teeth.

13. The combination defined in claim 8 wherein means are provided defining the limits of pivotal motion of said actuator and wherein a spring is connected between said actuator and said member for movement with said actuator relative to said member through a path passing through the pivot of said actuator relative to said member so that said spring will resiliently maintain said actuator at either of its limit positions at which it is set by its engagement with said stops.

14. In combination with a positive displacement fluid meter having a rotatable output element rotated in response to fluid flow through said meter, predetermining register means including a follower member mounted for pivotal movement by said output element at a rate proportional to the flow rate about the axis of said output element between first and second limit positions indicative, respectively, of the beginning of a flow registration cycle and of the passage of a predetermined quantity of fluid through the meter, means biasing said member toward said first limit position in the direction opposite to the direction of rotation of said output element, a clutch for drive connecting said member and said element, means at said first limit position to automatically engage said clutch to drive connect said element and said member whereby said element will drive said member about said axis as said element rotates in response to the flow of fluid through said member, means at said second limit position to automatically disengage said clutch to permit restoration of said member to said first position under the influence of said biasing means, selectively adjustable means for shifting the relative angular positions of said limit positions about said axis to vary the length of travel of said member between said limits comprising a fixed support, a stop member disposed adjacent said support and movable in an arcuate path about the axis of rotation of said output element, and selectively releasable means for fixing said stop member to said support, and means activated by movement of said member substantially at said first limit position for generating a signal indicative of the flow of said predetermined quantity of fluid through said meter.

15. In combination with a positive displacement fluid meter having a rotatable output element rotated in response to fluid flow through said meter, predetermining register means including a follower member mounted for pivotal movement by said output element at a rate proportional to the flow rate about the axis of said output element between first and second limit positions indicative, respectively, of the beginning of a flow registration cycle and of the passage of a predetermined quantity of fluid through the meter, means biasing said member toward said first limit position in the direction opposite to the direction of rotation of said output element, a clutch for drive connecting said member and said element, means at said first limit position for automatically engaging said clutch to drive connect said element and said member whereby said element will drive said member about said axis as said element rotates in response to the flow of fluid through said meter, means at said second limit position for automatically disengaging said clutch to permit restoration of said member to said first limit position under the influence of said biasing means, and means actuated by said member at one of said limit positions for producing an electrical output signal comprising switch means and means carried by said follower member for closing the contacts of said switch means.

16. In combination with a positive displacement fluid meter having a rotatable output element rotated in response to fluid flow through said meter, predetermining register means including a follower member mounted for pivotal movement by said output element at a rate proportional to the flow rate about the axis of said output element between first and second limit positions indicative, respectively, of the begining of a flow registration cycle and of the passage of a predetermined quantity of fluid through the meter, means biasing said member toward said first limit position in the direction opposite to the direction of rotation of said output element, a clutch for drive connecting said member and said element, means at said first limit position for automatically engaging said clutch to drive connect said element and said member whereby said element will drive said member about said axis as said element rotates in response to the flow of fluid through said meter, means at said second limit position for automatically disengaging said clutch to permit restoration of said member to said first limit position under the influence of said biasing means, and means adapted to be actuated by a signal from an external source operative when actuated to prevent restoration of said member to said first limit position under the influence of said biasing means despite the disengagement of said clutch.

References Cited in the file of this patent

UNITED STATES PATENTS

| | | |
|---|---|---|
| 1,928,086 | Barr | Sept. 26, 1933 |
| 2,051,155 | Staegemann | Aug. 18, 1936 |
| 2,082,788 | Brayer | June 8, 1937 |
| 2,084,317 | Brayer | June 22, 1937 |
| 2,458,978 | Chace | Jan. 11, 1949 |
| 2,589,650 | Wolcott | Mar. 18, 1952 |
| 2,689,218 | Waugh | Sept. 14, 1954 |
| 2,723,755 | Robinson | Nov. 15, 1955 |
| 2,765,104 | Ball | Oct. 2, 1956 |
| 2,857,763 | Hague et al. | Oct. 28, 1958 |
| 2,993,375 | Whittaker | July 25, 1961 |
| 3,028,050 | Nelson | Apr. 3, 1962 |